(12) United States Patent
Goldberg et al.

(10) Patent No.: US 6,731,837 B2
(45) Date of Patent: May 4, 2004

(54) OPTICAL FIBER AMPLIFIERS AND LASERS AND OPTICAL PUMPING DEVICES THEREFOR AND METHODS OF FABRICATING SAME

(75) Inventors: Lew Goldberg, Fairfax, VA (US); Marc Le Flohic, Saint Quey Perros (FR)

(73) Assignee: Keopsys, Inc., Fairfax, VA (US)

( * ) Notice: Subject to any disclaimer, the term of this patent is extended or adjusted under 35 U.S.C. 154(b) by 174 days.

(21) Appl. No.: 10/014,467

(22) Filed: Dec. 14, 2001

(65) Prior Publication Data

US 2002/0094159 A1 Jul. 18, 2002

Related U.S. Application Data

(63) Continuation-in-part of application No. 09/722,271, filed on Nov. 28, 2000.

(51) Int. Cl.[7] .................... G02B 6/42; H01S 3/091; H01S 3/30
(52) U.S. Cl. .............. 385/27; 385/43; 385/50; 372/6; 372/69; 359/341.3
(58) Field of Search ........... 385/21, 31, 33–34, 385/43, 49, 50, 27–29, 48, 126–128; 372/6, 69–71; 359/341.3, 341.32

(56) References Cited

U.S. PATENT DOCUMENTS

| | | | |
|---|---|---|---|
| 4,815,079 A | | 3/1989 | Snitzer et al. |
| 4,900,114 A | * | 2/1990 | Mortimore et al. .......... 385/96 |
| 5,854,865 A | | 12/1998 | Goldberg |
| 5,864,644 A | | 1/1999 | DiGiovanni et al. |
| 6,324,326 B1 | * | 11/2001 | Dejneka et al. ............. 385/123 |
| 6,525,872 B1 | * | 2/2003 | Ziari et al. ................ 359/341.3 |
| 6,543,942 B1 | * | 4/2003 | Veng ......................... 385/95 |
| 2002/0106150 A1 | * | 8/2002 | Bendett ...................... 385/27 |

OTHER PUBLICATIONS

Shuji Mononobe, et all, "Fabrication of a Pencil–Shaped Fiber Probe for Near–Field Optices by Selective Chemical Etching", Journal of Lightwave Technology, vol. 14, No. 10, Oct. 1996, p.p. 2231–2235.

J.D. Minelly, et al., "Efficient Cladding Pumping of an Er3+ Fibre", Proc. 21st Eur. Conf. on Opt. Comm ECOC 1995, p.p. 917–920.

P. Bousselet, et al., "+ 26 dBm Output Power from an Engineered Cladding–Pumped Yb–Free EDF for L–Band WDM Applications", Alcatel Corporate Researc Centre, OFC 2000, p.p. 114–116.

Piotr Myslinski, et al., "Effects of Concentration of the Performance of Erbiym–Doped Fibe Amplifiers", Journal of lightwave technology, vol. 15, No. 1, Jan. 1997, p.p. 112–119.

J.E. Townsend, et al., "yb3+ Sensitised Er3+ Doped Silica Optical Fibre with Ultrahigh Transfe Efficiency and Gain", Electronics letters, Oct. 10, 1991, p.p. 1958–1959.

Martin E. Fermann, et al., "Single–Mode Excitattion of Multimode Fibers with Ultrashort Pulses", Optics Letters, vol. 23, No. 1, Jan. 1, 1998, p.p. 52–54.

L. Goldberg, et al., "Highly Efficient 4–W Yb–Doped Fiber Amplifier Pumped by a Broad Stripe Laser Diode", Optics Letters, vol. 24, 1999, pp. 673–675.

* cited by examiner

*Primary Examiner*—Edward J. Glick
*Assistant Examiner*—Krystyna Suchecki
(74) *Attorney, Agent, or Firm*—Andrews Kurth LLP

(57) ABSTRACT

A method and apparatus for high power, broad gain, high efficiency, low noise, cladding pumped fiber amplifiers and lasers. The present invention allows a much higher pump light intensity in the inner cladding of a double cladding fiber to be achieved than is possible with conventionally pumped double cladding fiber amplifiers. The present invention utilizes a fiber taper in which the inner cladding decreases from a wide to narrow portion with the fiber core remaining the same diameter.

40 Claims, 10 Drawing Sheets

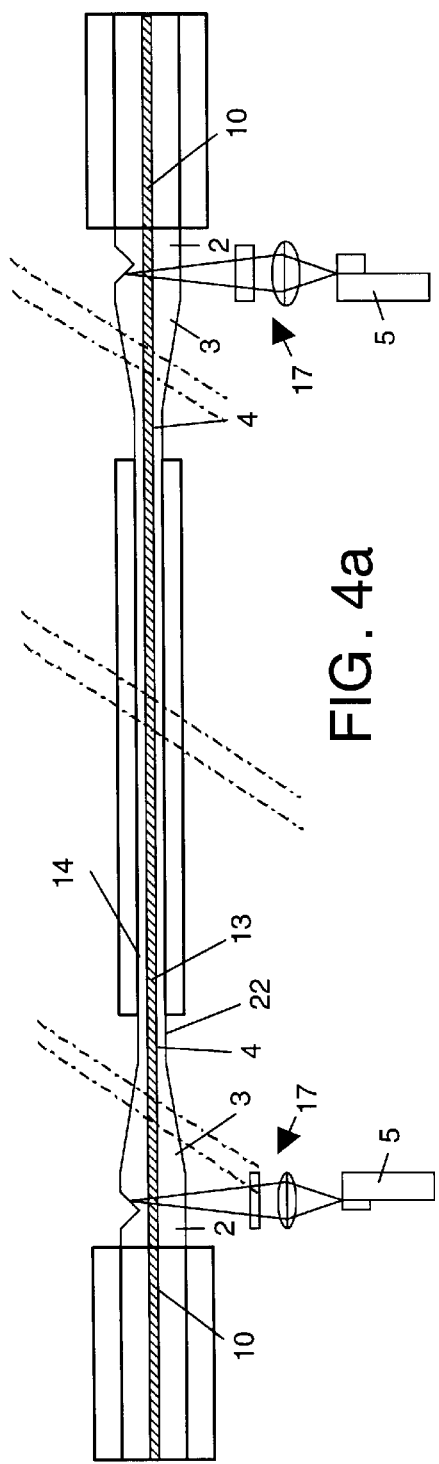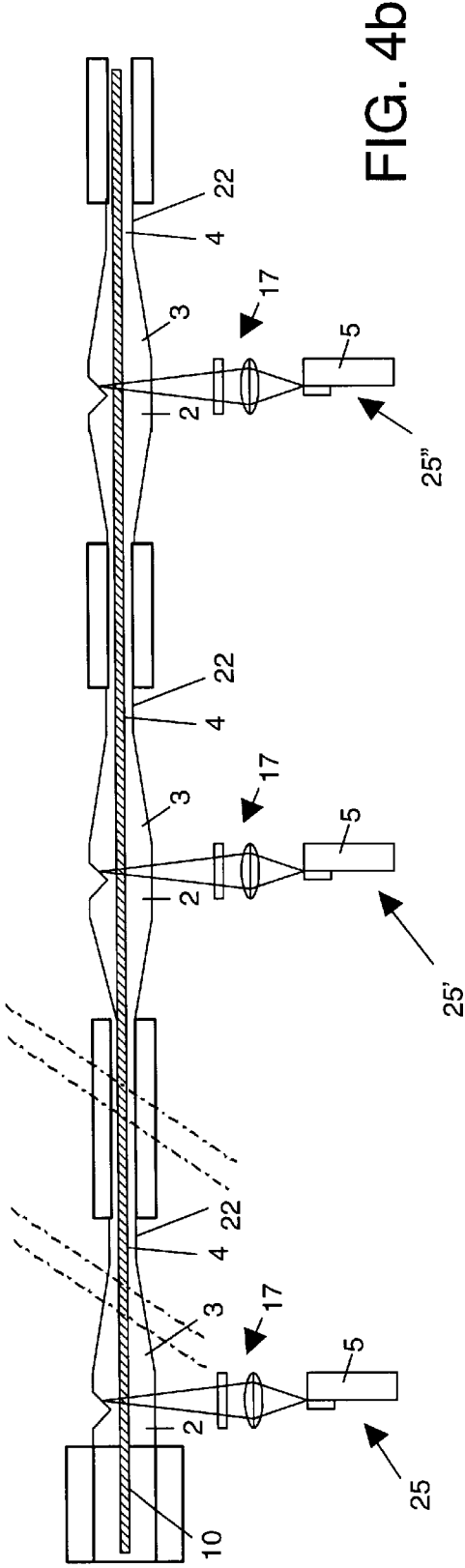

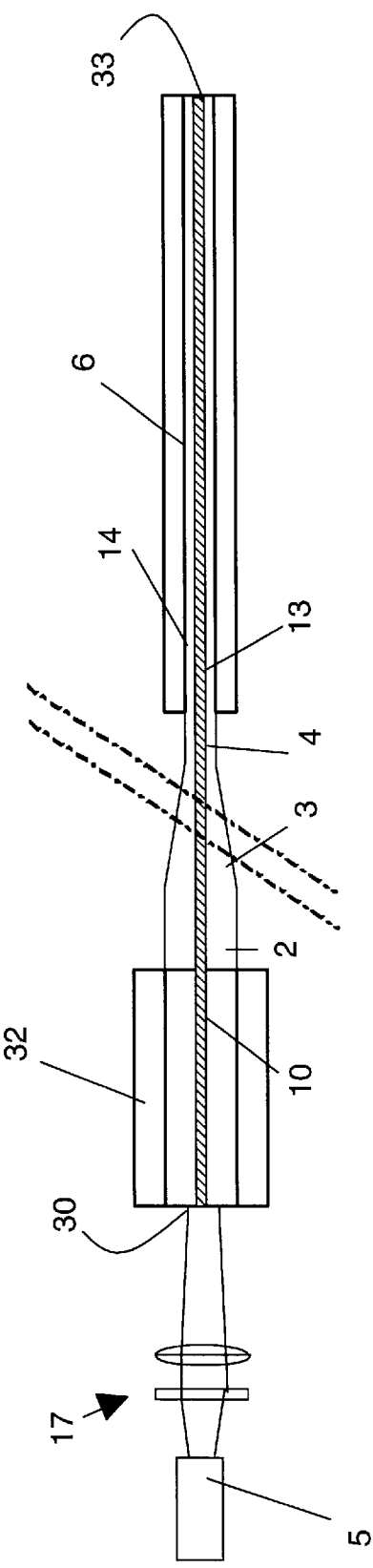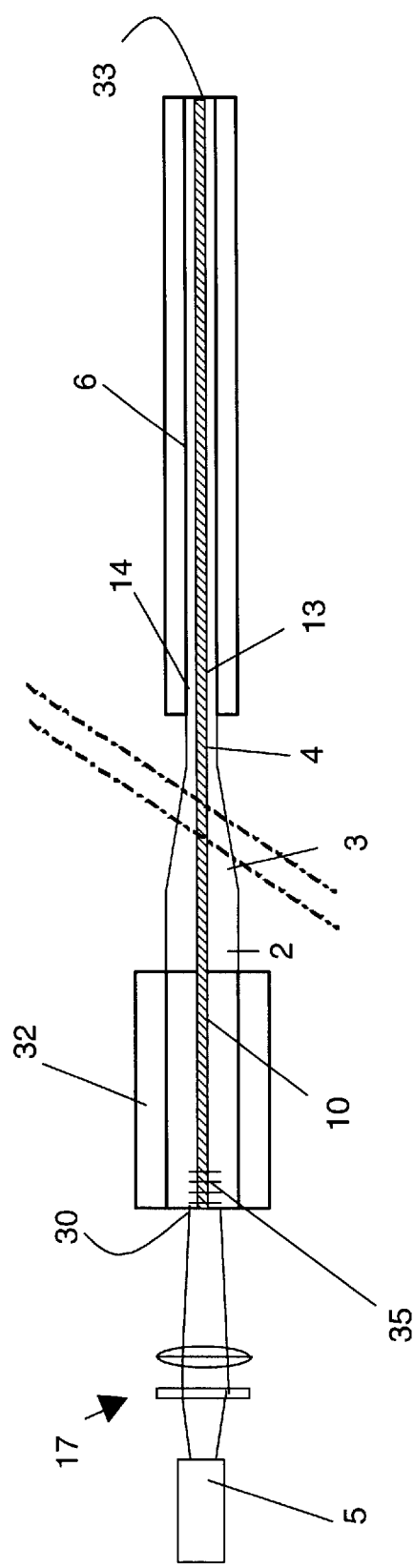

OPTICAL FIBER AMPLIFIERS AND LASERS AND OPTICAL PUMPING DEVICES THEREFOR AND METHODS OF FABRICATING SAME

This application is a continuation-in-part of U.S. patent application Ser. No. 09/722,271, entitled "Optical Fiber Amplifiers And Lasers And Optical Pumping Device Therefor" and filed Nov. 28, 2000, which is herein incorporated by reference.

BACKGROUND OF THE INVENTION

1. Technical Field

The technical field is fiber amplifiers and lasers and specifically devices for optically pumping these in order to create a population inversion within an active medium of such amplifiers and/or lasers.

2. Description of Related Art

Devices for optically pumping fiber amplifiers and lasers are currently being used in time division and wave length division multiplex fiber communication systems, free space communication systems, remote measurement and sensing, scientific and laboratory experimentation and other applications.

One problem in the design of fiber amplifiers and lasers is to administer pump light to the active medium of the fibers with a power intensity sufficient to produce a reasonable gain.

Transversal pumping schemes popular with lasers in which the active medium has cross section dimensions of at least several millimeters are not straightforwardly applicable to fiber amplifiers and lasers. Due to the small cross section, overall absorption of transverse pumping light in the fiber is low, resulting in poor efficiency. On the other hand, absorption cannot be increased by increasing the concentration of the active species within the host material of the active medium since this may lead to thermal problems, to a narrowing of the gain vs. wavelength distribution and to other undesirable effects.

Accordingly, setups for longitudinally pumping fiber amplifiers and lasers have been studied. For example, in L. Goldberg, I. P. Koplow, D. Kliner, "Highly efficient 4-W Yb-doped fiber amplifier pumped by a broad stripe laser diode", Optics Letters, volume 24, pages 673 to 675, 1999, it has been shown that longitudinal pumping of a double cladding fiber structure is an effective approach for constructing high power fiber amplifiers and lasers. Similar pumping setups are known from U.S. Pat. No. 4,815,079, J. D. Minelli et al., "Efficient cladding pumping of an Er fibre", paper Th.L.1.2, Proceedings of 21$^{st}$ European Conference on Optical Communications, Brussels 1995, and P. Bousselet et al., 26 dBm output power from an engineered cladding-pumped Yb-free EDFA for L-band WDM applications", paper WG5-1, Optical Fiber Conference San Francisco 2000.

Since the typical dimension of the inner cladding of such a fiber is 90 to 150 μm, non-diffraction limited emission from high power broad area laser diode pumps can be efficiently coupled into such fibers. A 90 μm wide broad stripe laser diode can generate an output power of 2 to 4 W at 89, 915 or 980 nm with long operating life.

The pump absorption coefficient of a double cladding fiber is inversely proportional to the ratio between the inner cladding area and the core area, which is typically in the range of 200–500. Because of this large ratio it is necessary to use very high dopant densities in order to achieve an adequate pump absorption coefficient, which is required to construct a reasonably short amplifier. Excessively long fiber amplifiers are not desirable because of background propagation losses in the gain fiber, increased cost, and signal distortion and interaction caused by nonlinear effects in the fiber core.

High doping densities can be used with certain dopants, such as Yb, where a concentration of $10^4$ to $2 \times 10^4$ ppm results in a typical cladding absorption coefficient of 1–3 dB/m at the peak Yb absorption wavelength of 975 nm. Erbium is more desirable as an active species for fiber amplifiers due to its usable gain band of 1530 to 1600 nm within the maximum transmission window of common fiber-glass compositions. However, it has been shown by P. Myslinski, D. Nguyen and J. Chrostowski, "Effects of Concentration on performance of Erbium-doped Fiber Amplifiers", J. Lightwave Tech., v. 15, pp. 112–119 (1997) that in case of Er the concentrations must be kept at least ten times smaller (typically below 900 ppm) than these values to avoid concentration quenching effects which significantly reduce amplifier quantum efficiency.

A known technology for circumventing this deficiency is Er/Yb co-doping (cf. J. E. Townsend, W. L. Barnes, K. P. Jedrzejewski, S. G. Grabb, "Yb-sensitized Er Doped Silica Optical Fiber with High Transfer Efficiency and Gain", Electronics Lett. v. 27, pp. 1958–1959, (1991) where high Yb concentration (10–20 times that of Er) is used to achieve high pump absorption, and energy absorbed by Yb is efficiently transferred to Er ions. To achieve this efficient transfer, however, the core glass composition needs to have a large $P_2O_5$ content. Such gain fibers are difficult to fabricate with low background loss and high quantum efficiency. In addition the presence of $P_2O_5$ in the host glass causes substantial narrowing of the gain vs. wavelength distribution, and results in a small signal gain distribution that is much less uniform than that of amplifiers with Er-doped silica host glass cores. This gain non-uniformity makes the Er/Yb co-doped amplifiers unsuitable for WDM applications that require relatively flat gain distribution across a wide wavelength span.

An attractive method for constructing high power Er-doped amplifiers is to use double cladding structures having a small-inner-cladding. Such devices are described in J. D. Minelli, Z. J. Chen, R. L. Laming, J. D. Caplen, "Efficient cladding pumping of an Er fibre", paper Th.L.1.2, Proceedings of 21$^{st}$ European Conference on Optical Communications, Brussels 1995, and in P. Bousselet, M. Bettiati, L. Gasca, M. Goix, F. Boubal, C. Sinet, F. Leplingard, D. Bayart, "26 dBm output power from an engineered cladding-pumped Yb-freeEDFA for L-band WDM applications", paper WG5-1, Optical Fiber Conference, San Francisco, 2000.

A small cladding, and a correspondingly small cladding-to-core area ratio make it possible to achieve high pump absorption with reasonably low concentrations. A maximum Er concentration of approximately 900 ppm, possible with a host glass with a large $Al_2O_3$ content, would result in a core absorption coefficient of approximately 20 dB/m. In a double cladding fiber with an area ratio of A(cladding)/A (core)=25–910, this would result in a cladding absorption coefficient of 0.8–0.2 dB/m. Assuming 90% pump absorption, these absorption coefficients are sufficiently high to construct efficient amplifiers with a length of 12 to 60 m, comparable to that of conventional, core-pumped amplifiers. Assuming a typical core diameter of 5 μm these cladding-to-core area ratios require an inner cladding diameter of 25–50 μm. The upper limit of core diameter, as dictated by bend losses and mode mismatch losses when fusion splicing to conventional transmission fibers, is represented by a 0.1 NA core of 9 μm, corresponding to a cutoff wavelength of approximately 1.45 μm. Such a core size would allow larger cladding diameters and/or larger absorption coefficients.

In addition to achieving sufficiently high pump absorption in double cladding fibers, another issue that must be addressed is whether a sufficiently high pump intensity can be achieved to produce a population inversion level required for high gain across the entire usable gain band of the active species. For Er, the threshold pump intensity, required for a 50% population inversion (50% of the ion population is in the upper state $^4I_{13/2}$) is given by $I_{th}=h\nu/st=9$ kW/cm$^2$, where $h\nu$ is the photon energy, $s=2\times10^{-21}$ cm$^2$ @980 nm is the absorption cross-section and t~9 ms is the upper state lifetime. To achieve high gain and low noise performance in the amplifier, a population inversion of >80% is desirable, requiring a pump intensity that is approximately 5 $I_{th}$, or 50 kW/cm$^2$. For a cladding pumped fiber amplifier with a 50 μm cladding diameter, this requires a local pump power of 1 W. Since in an efficient amplifier the fiber needs to be sufficiently long to allow almost complete pump light absorption, the local pump intensity decreases exponentially as a function of position, causing a decrease in the local population inversion with distance from the front end of the amplifier. As a result, the pump power has to be larger by a factor of 2–3 than the value calculated above for the case of uniform pump intensity distribution. It is difficult to couple such power levels into an end surface of a double cladding amplifier fiber with little loss and with a focus tight enough to ensure that the pump power is essentially coupled into the inner cladding layer and at the same time to avoid damage to the end surface of the fiber due to excessive incident power.

SUMMARY OF THE INVENTION

An embodiment is a method and apparatus that provides a double cladding fiber taper and an optical pumping device through which particularly high pump power densities can be coupled into a cladding layer of an optical fiber. An advantage of the present invention is that it preferably maintains a high-level of packaging or coupling alignment tolerance so that they may be easily installed and used in an environmentally insensitive fiber amplifier.

Another advantage of the present invention is that it provides an optical pumping device by which pump light at particularly high power densities can be coupled into a cladding of an amplifying fiber, and light amplified by the fiber or to be amplified by the fiber can be coupled into and out of the fiber without a significant modification of the mode structure. Yet another advantage is providing an optical pumping device in which the light from a light source is gathered with high efficiency and is coupled into the amplifier fiber with low loss. Still another advantage is providing an optical fiber amplifier and an optical fiber laser that achieve a high gain over a small length of fiber.

These and other advantages of the present invention are achieved by an optical pumping device for pumping a fiber amplifier or fiber laser. The optical pumping device includes a light guiding section that includes a cladding layer surrounding a fiber core. The cladding layer includes a wide diameter portion, including a lateral v-shaped groove in the wide diameter portion, a narrow diameter portion, and a tapered portion, connecting said wide and narrow diameter portions. The tapered portion is fabricated with a heating and pulling technique. The optical pumping device also includes a light source arranged to couple pump light into the cladding layer at the wide diameter portion, said light essentially propagating along the tapered portion towards the narrow diameter portion, wherein the light source is arranged to irradiate the v-shaped groove.

Likewise, these and other advantages of the present invention are achieved by an optical fiber device. The optical fiber device includes a first pumping device and a gain fiber. The first pumping device includes a light guiding section and a light source. The light guiding section includes a cladding layer surrounding a fiber core that has a core diameter. The cladding layer has a wide diameter portion, a narrow diameter portion and a tapered portion connecting said wide and narrow diameter portions and the tapered portion is fabricated with a heating and pulling technique so that the core diameter is narrower in the narrow diameter portion than the wide diameter portion. The light source is arranged to couple pump light into the cladding layer at the wide diameter portion, said light essentially propagating along the tapered portion towards the narrow diameter portion. The gain fiber include a first cladding layer and a doped core. A first end of the gain fiber is connected to the narrow diameter portion of the light guiding section in order to propagate light from the light source through the first cladding layer of the light guiding section into the first cladding layer of the gain fiber.

These and other advantages of the present invention are achieved by a method of fabricating an optical pumping device. The method includes steps of heating a first fiber of a constant first diameter until the fiber is capable of being stretched, pulling the heated first fiber to create a wide portion, a tapered portion and a narrow portion in the heated first fiber, and coupling a light source into the wide portion of the first fiber. The wide portion has the constant first diameter, the narrow portion has a constant second diameter that is smaller than the constant first diameter, and the tapered portion has a tapering diameter that joins and tapers from the wide portion to the narrow portion. The coupling step includes fabricating a v-groove into the wide-portion of the first fiber. The method further includes focusing light from the light source into the v-groove and connecting the first fiber to a gain fiber.

These and other advantages of the present invention are achieved by a method of fabricating an optical pumping device. The method includes steps of bringing a first fiber into contact with a polishing surface so that the contact pressure between the fiber and the polishing surface increases along the first fiber, rotating the first fiber in contact with the polishing surface so as to remove material from the circumference of the fiber whereby a wide portion, a tapered portion and a narrow portion are formed in the first fiber, and arranging a light source for coupling pump light into the wide portion of the first fiber. The tapered portion has a tapering diameter that joins and tapers from the wide portion to the narrow portion.

A typical diameter ratio of the wide diameter portion to the narrow diameter portion may be in a range of 1.5:1 to 6:1. Under proper conditions, such a taper concentrates the pump light injected into the wide end of the taper into the narrow end of the taper, thereby achieving an increase in the pump intensity equal to the square of the taper ratio, or a factor of 2.3 to 36. In order to avoid any modification in the mode structure of light propagating in a core of the amplifying fiber, it is preferable that the diameter of the fiber core of the light guiding section of the optical pumping device is the same in the wide diameter, tapered and narrow diameter portions. The ratio of diameters of the first cladding layer and the core in the narrow diameter portion is preferably in a range from 1.5:1 to 9:1, small ratios being preferred for shorter amplifiers. Other ratios, outside of this range may be used.

According to an embodiment, a lateral v-shaped groove is formed in the first cladding layer at the wide diameter portion, and the light source is arranged to irradiate the groove. In particular, pump light from the light source may be incident on a facet of the groove from a side of the wide diameter portion opposite that of the groove. In this way, light incident at a near normal angle with respect to an axis of the light guiding portion may be reflected towards the tapered portion along said axis or at small angles relative to the axis.

In order to avoid loss of pump light during its propagation through the tapered portion, at the pump light may be coupled into the wide diameter portion with a small numerical aperture of 0.05 to 0.2. For this purpose, a first lens may be provided for gathering light from the light source with a large first numerical aperture in a first plane and focusing it onto the facet of the groove with a second numerical aperture smaller than the first one, preferably in the range of 0.05 to 0.2.

As a pump light source, a broad stripe laser diode may be used. In contrast to low power (90–200 mW) diffraction limited laser diodes having stripe widths of 2–5 micrometers, this type of high power laser diode, typically has a stripe width of 90–200 micrometers which allows it to generate 2–4 W of power. Since such a laser diode has different angular spreads of its output beam in its junction plane and in a plane perpendicular thereto, a second lens may be provided for gathering light from the light source with a third numerical aperture in a second plane and focusing it onto the facet of the groove with a fourth numerical aperture, the third numerical aperture being smaller than the first one and the second and fourth numerical apertures being approximately the same. In an embodiment, the first and second lenses are crossed cylindrical lenses.

According to an alternative embodiment, the light source is arranged to couple light into an end surface of the wide diameter portion of the light guiding section. For this purpose, a dichroic mirror may be provided having a reflectivity adapted to combine and/or separate pump light from the light source and a light at an active wavelength of the fiber amplifier or laser.

An optical fiber amplifier may be formed by connecting, preferably fusion splicing, a first end of a gain fiber comprising a first cladding layer and a doped core to the narrow diameter portion of the light guiding section of a pumping device as defined above, in order to propagate pump light from the pump light source through the first cladding layer of the light guiding section into the first cladding layer of the gain fiber. Preferably, in this optical fiber amplifier, the gain fiber has a second cladding layer surrounding the first cladding layer, the second cladding layer having a lower refractive index than that of the first cladding layer. In this way pump light losses are avoided which would inevitably occur if the first cladding were directly surrounded by a fiber jacket that typically has a higher refractive index than the cladding. The number of cladding layers of the gain fiber is not limited to two.

In order to achieve a homogeneous pump power distribution over the length of the gain fiber, a second pumping device of the type defined above can be connected to a second end of the gain fiber, or further pumping devices may be inserted at intermediate locations of the gain fiber.

A dopant of the doped core of the gain fiber is preferably selected from a group of rare earth ions such as Er, Yb, Er/Yb, Nd, and Tm. For amplifiers having a gain distribution in the 1.5 $\mu$m range, the doped core may be doped with Er only, so that the core glass may have a small component of $P_2O_5$.

A fiber laser having features and advantages similar to those of the optical fiber amplifier explained above can be obtained if the optical gain fiber is equipped with reflectors at its ends.

Various methods according to the present invention for fabricating the tapered and narrow sections of the light guiding sections are disclosed herein. These methods include chemical etching or laser ablation of the fiber surface to produce the desired taper. Another method according to the present invention includes a heating and pulling technique, in which the fiber is heated to the softening point of silica and pulled to create the tapered region. Still another method according to the present invention is a polishing method, in which the fiber is mounted in a rotating mount so that it contacts a polishing disc at an angle and is bent so that a variation in the contact pressure with the rotating disc and a resulting varying rate of glass removal along the fiber is achieved.

Further features and, advantages of the present invention will become apparent from the subsequent description, by word and drawing, of preferred embodiments of the present invention.

BRIEF DESCRIPTION OF THE DRAWINGS

The invention will be described in detail in the following description of preferred embodiments with reference to the following figures, in which like numbers refer to like elements, wherein:

FIGS. 4A and 4B are schematic diagrams illustrating a fiber amplifier having more than one optical pumping device according to the present invention.

FIGS. 6A and 6B are schematic diagrams illustrating fiber lasers equipped with optical pumping devices according to the present invention.

DETAILED DESCRIPTION OF THE INVENTION

Figure 1:
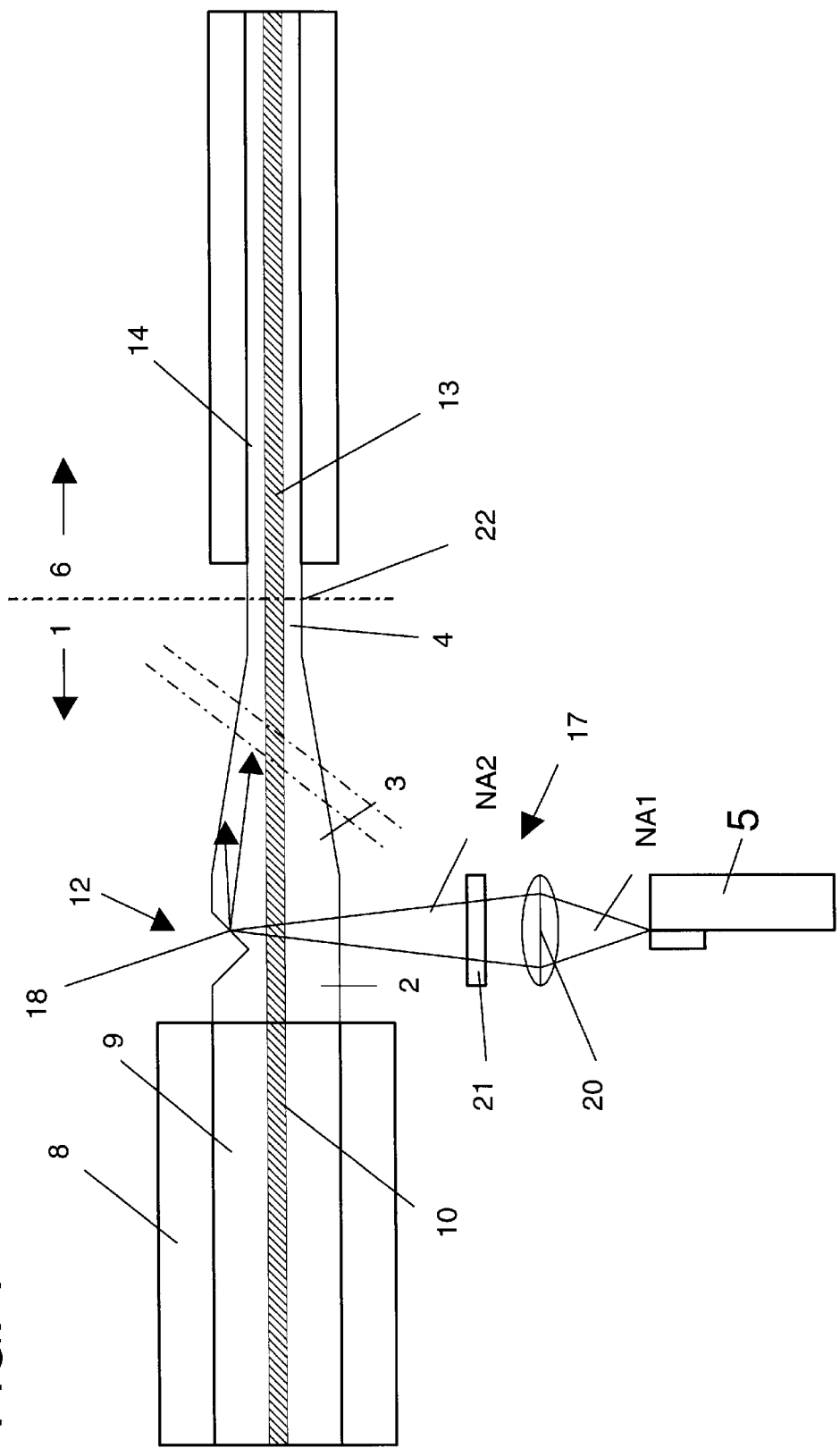
FIG. 1 is a schematic diagram illustrating a longitudinal section of a fiber amplifier having an optical pumping device according to the present invention.

FIG. 1 shows a fiber amplifier comprising an optical pump device according to a first preferred embodiment of the present invention. The fiber amplifier comprises a light guiding section 1 formed of a single mode fiber pigtail, a broad stripe pump laser diode 5 as a light source, and a double cladding gain fiber 6. The light guiding section 1 is made from a single mode fiber having a jacket 8, a cladding 9 inside the jacket and a single mode undoped core 10 at the center of the cladding. In a first portion of the light guiding section 1, at the left-hand side of FIG. 1, this fiber structure is left intact. In an adjacent wide diameter portion 2, the jacket 8 is removed, so as to expose the cladding 9, and a v-shaped groove 12 is formed at one side of the cladding 9.

Adjacent to this wide diameter portion 2, there is a tapered portion 3 in which the outer diameter of the cladding 9 is gradually reduced so that the length of this tapered portion 3 is typically about 100× the diameter of the wide diameter portion 2 and the ratio of the diameter or the wide diameter portion 2 to the diameter of the narrow diameter portion is typically between 1.5:1 to 6:1 (the "taper reduction factor").

A narrow diameter portion 4 at the narrow end of tapered portion 3 is connected, for example by fusion splicing, to double cladding gain fiber 6. Alternatively, the light guiding section 1 and the gain fiber 6 may be constructed from one fiber. The diameter of the cores 10, 13 of the light guiding section 1 and the gain fiber 6 are identical, and so are the outer diameters of narrow portion 4 and of inner cladding 14 of the gain fiber 6.

The light guiding section 1 may be formed from a piece of optical fiber for example, by a chemical etching, laser ablation technique or other methods. In order to form the light guiding section by etching, an end portion of a piece of fiber having its jacket removed may be suspended in an etching solution, the solution initially covering what is to become the tapered and narrow diameter portions 3, 4 of light guiding section 1. The fiber is then gradually raised out of the etching solution, so that the total exposure time to the etching solution will increase as the end of the fiber is approached. By controlling the raising speed, the angle of taper may be defined. As an etching solution, solutions of hydrofluoric acid are applicable.

In FIG. 1, portions 2 and 4 are shown to have a finite length with a constant diameter. However, the length of these portions might be reduced to 0. The wide diameter portion 2 in which the v-shaped groove 12 is formed might be tapered just like tapered portion 3.

Figure 2:
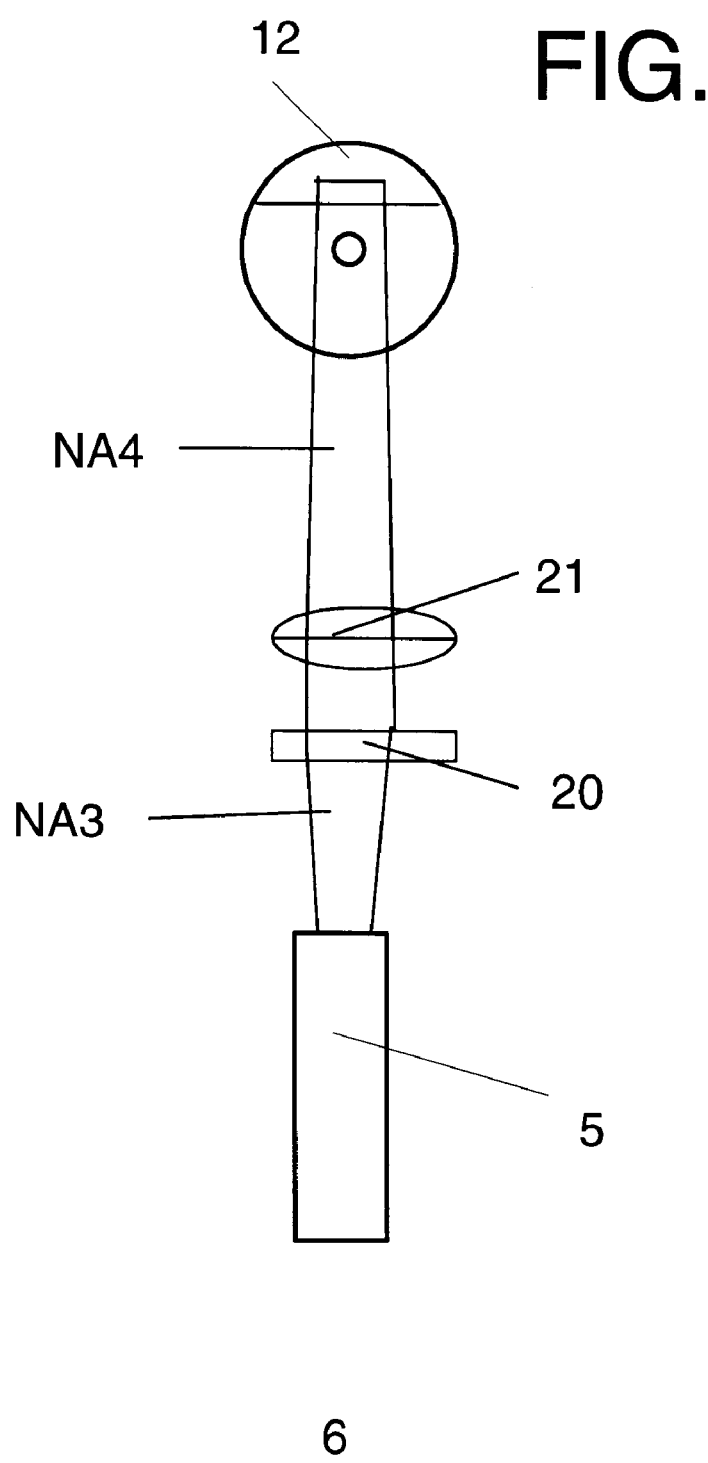
FIG. 2 is a schematic diagram illustrating a cross section of the optical fiber amplifier of FIG. 1 taken along the plane referenced II—II in FIG. 1.

Pump light is generated by a broad area laser diode 5. Typically such diodes have an emission region of 1×100 $\mu$m, but diodes with an emitter width of up to 500 $\mu$m are available and can be used. In such a diode, the longer one of the two dimensions of the emission region is parallel to a plane of a diode junction, whereas the shorter one is in a plane perpendicular to the junction. In the plane perpendicular to the diode junction the emission, confined to approximately 1 $\mu$m at the diode facet, is diffraction limited and diverges with a large angle, equivalent to a first numerical aperture of typically 0.5. In the plane parallel to the diode junction the emission at the diode facet is 100 $\mu$m wide, is spatially incoherent, and diverges at a relatively small angle equivalent to a third numerical aperture of 0.1. As shown in FIG. 1, an optical system 17 is provided in order to efficiently collect the light from the laser diode 5, reduce its divergence angle and focus it onto a facet 18 of the v-shaped groove 12 with a second and fourth numerical apertures. These various numerical apertures are designated as NA1, NA2, NA3, and NA4 in FIGS. 1 and 2.

The v-shaped groove 12 has an orientation perpendicular to the longitudinal access of the light guiding section, its facets are at right angles (90°) with respect to each other, and, in particular, its facet 18 has an angle of approximately 45° with respect to the core, so that pump light incident from the laser diode 5 at a right angle with respect to the core will be reflected essentially parallel to the core towards tapered portion 3. Reflection may be achieved by total internal reflection at the facet 18, or a reflective coating may be formed on facet 18.

The function of the tapered portion 3 is to reduce the diameter of cladding 9 by a fixed ratio, while preserving the brightness of the pump light in the tapered portion 3. As the light intensity increases as the pump light propagates from the wide to the narrow diameter portion of light guiding section 1, the pump light's divergence angle or numerical aperture increases due to multiple reflections at the surface of cladding 9, as becomes apparent from FIG. 3. Since the numerical aperture of the double inner cladding 14 of cladding gain fiber 6 is typically limited to 0.4–0.6, to assure that light in the narrow end of the taper is within this range, the input beam has to have as small a numerical aperture as possible. To obtain such a pump bean, the optical system 17 of FIG. 1 contains two crossed cylindrical lenses; a high NA (>0.5) lens 20 which nearly completely captures diode 5 emission perpendicular to the junction having said first numerical aperture NA1, and focuses it on the facet 18 of the v-shaped groove 12 with a magnification factor of 5–10, resulting in a second numerical aperture NA2 of the incident beam NA=0.05–0.1, and a low NA lens 21 which collects the light parallel to the junction having said third numerical aperture NA3 and images it on the v-shaped groove 12 with a magnification factor of approximately 1, resulting in a fourth numerical aperture NA4 of the incident beam NA=0.1. With this configuration, a pump beam with a numerical aperture of 0.1 or less is coupled into the wide diameter portion 2 of the light guiding section 1, allowing a taper reduction factor of between 1.5 to 6. Using the above-described setup, a coupling efficiency of 90% of pump light from laser diode 5 to gain fiber 6 can be achieved.

Another advantage of the present invention is that it allows the pump coupling to be carried out in the wide diameter section 2 of the fiber instead of a small diameter fiber. The large fiber diameter of the wide diameter section 2 makes it possible to fabricate a v-groove with a large depth and width so that the spot of light formed by the focused laser diode 5 light is intercepted by a relatively large v-groove facet. This large facet area results in a diode-lens-v-groove alignment tolerance increase, approximately equal to the ratio of the wide diameter section 2 to the small diameter fiber diameter. Using an example of a small diameter fiber with a 50 micrometers fiber with an 8 micrometers core, and assuming a 5 micrometers distance between the v-groove apex and the fiber core, the maximum allowed v-groove depth is approximately 16 micrometers. Such a small v-groove depth would require a very tight alignment tolerance, only a factor of two better than that associated with single mode fiber pigtailing. On the other hand, a similar fiber with a 125 micrometers cladding in the wide diameter section 2 would allow a v-groove depth of 53 micrometers, a 3-fold improvement over the small diameter fiber case and an improvement of approximately 7-fold over single mode fiber pigtailing. This permits the construction of an environmentally insensitive fiber amplifier or laser.

Other optical systems for achieving the collection and beam conditioning functions described can be used, such as combinations of spherical and cylindrical lenses, or a microlens in which the front and back surfaces constitute crossed cylindrical lenses.

Figure 3:
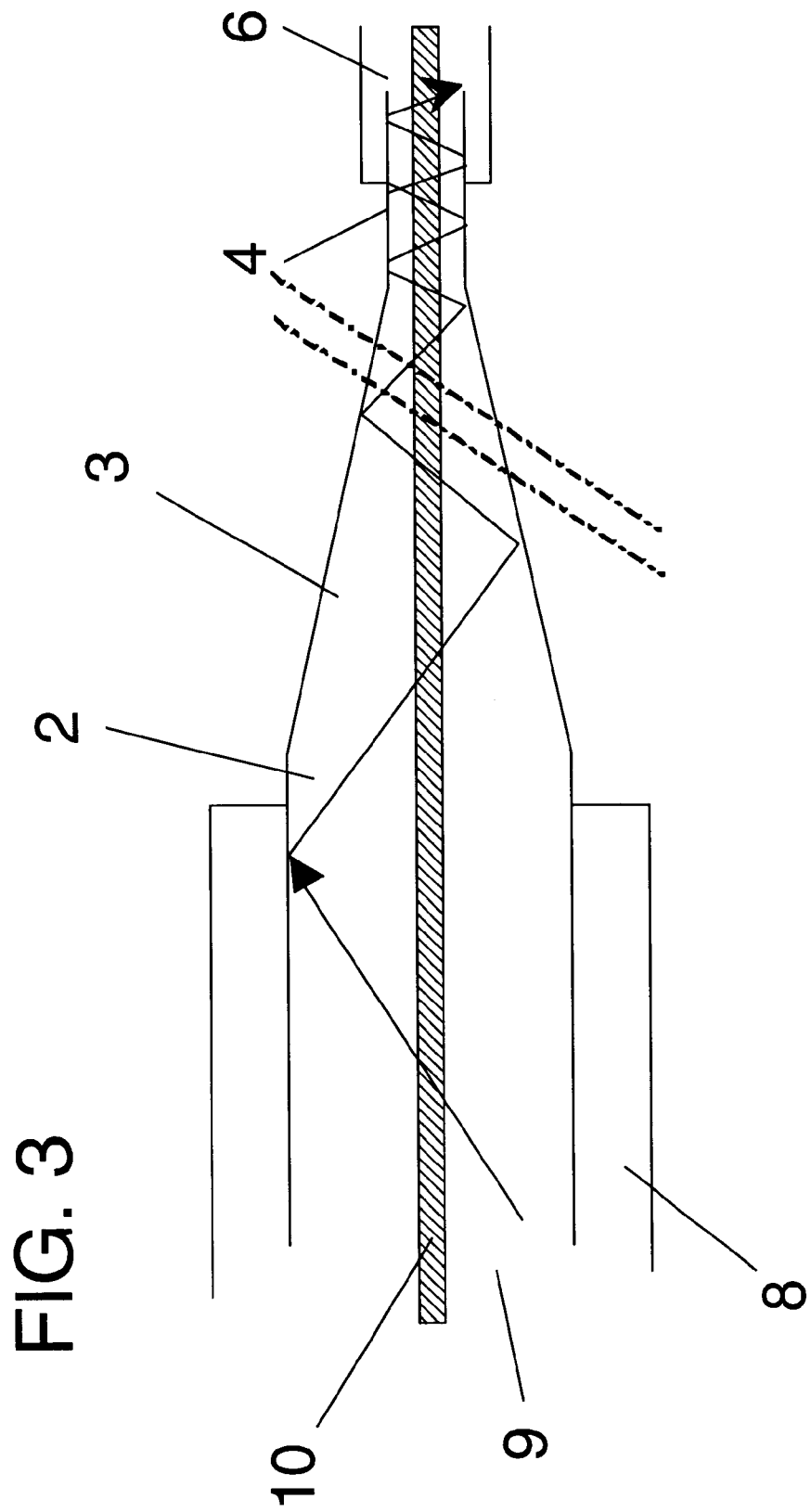
FIG. 3 is a schematic diagram illustrating a longitudinal cross section of a light guiding portion of an optical pumping device that illustrates the propagation of light in the tapered portion thereof.

After coupling into the light guiding section 1 at the wide diameter portion 2, the pump light propagates into tapered portion 3 as shown in FIG. 3. In order to avoid power losses in the tapered portion 3 for light propagating in the cladding, the reduction of the cladding diameter has to take place slowly, typically over a distance of approximately 100 times the fiber diameter of wide portion 2. A shorter distance may be used for smaller taper reduction factors (e.g., 50 times the fiber diameter of the wide portion). For example, for a wide portion diameter of 125 micrometers, the taper section 3 length is approximately 100×125 micrometers=125 mm. Accordingly, the FIGURES are not to scale, as the full length of the taper section 3 is not shown in the FIGURES. Light propagating in the tapered portion 3 is concentrated into the narrow end while its divergence angle or numerical aperture increases. For meridional rays, the numerical aperture of the propagating light distribution increases by the ratio of the diameter of the wide end of tapered portion 3 to the diameter of the narrow end, while for skew rays the numerical aperture increases slightly more strongly. Since the diameter of core 10 and the infractive index distribution in tapered portion 3 do not vary in the direction of propagation of the light, signal light in the core can propagate unperturbed through the light guiding section 1.

In order for the cladding 9 in the tapered portion 3 to serve as a waveguide, a low refractive index material that may constitute an outer cladding of light guiding section 1 surrounds the tapered portion 3. Under these circumstances, the tapered portion functions as a double cladding fiber with the pump light confined in the inner cladding surrounding 9 the core. Typically, such a low refractive index outer cladding is a polymer, but air can also constitute such an outer cladding.

The narrow diameter portion 4 of light guiding section 1 may be coupled to the double cladding gain fiber 6 by a fusion splice 22. Ideally, to avoid signal loss at the splice 22, the mode field diameters of the doped core 13 of double cladding gain fiber 6 and the core 10 of light guiding section 1 should be equal, and so should the diameter of cladding 9 at the narrow diameter portion 4 and inner cladding 14 of gain fiber 6.

The length of double cladding gain fiber 6 is chosen to optimize the amplifier efficiency, gain and noise characteristics based on available pump power from the laser diode 5, dopant concentration in gain fiber 6, ratio of diameters of core 13 and inner cladding 14, etc. For example, for a concentration of 1000 ppm and a core diameter of 8 $\mu$m and a cladding diameter of 40 micrometers the absorption coefficient is approximately 20 dB/m/25=0.8 dB/m. To achieve nearly complete pump absorption, a gain fiber 6 length of 10 to 20 m would be required. The far end of double cladding gain fiber 6 can be fusion spliced to a second single mode fiber pigtail to remove the residual pump light in the cladding 14.

With reference now to FIG. 4A, an alternative embodiment of the fiber amplifier is shown. A second pumping device similar to that of FIG. 1 may be coupled to the far end of gain fiber 6 by a second fusion splice 22'. Such an arrangement results in doubling the amount of pump power that can be coupled into the gain fiber 6, making possible a significant increase in amplifier outlet power and population inversion.

Further scaling of the fiber amplifier can be achieved through the use of multiple pumping devices 25, 25', 25" located at terminal and intermediate positions of the fiber amplifier and connected in series, as shown in FIG. 4B. In this embodiment, the pumping devices 25, 25', 25" are separated by sufficient lengths of gain fiber 6 to absorb the pump light from one device before it can reach the v-groove 12 of the next device.

In the embodiment of FIG. 4B, all laser diodes are shown to illuminate the same facet (the right hand facet) of the respective light guiding portions 1, so that the pump light will always all be either co-propagating or counter-propagating with respect to light to be amplified in the fiber core. Of course, in pumping devices such as 25' or 25" that are located at an intermediate position between two lengths of gain fiber 6, the optical system 17 might be arranged so as to focus the light from the laser diode 5 onto the edge between the two facets of its respective groove, or a beam splitter might be provided for directing two beams on the two facets, in order to distribute the light from the laser diode 5 between the two neighboring lengths of gain fiber 6.

Figure 5:
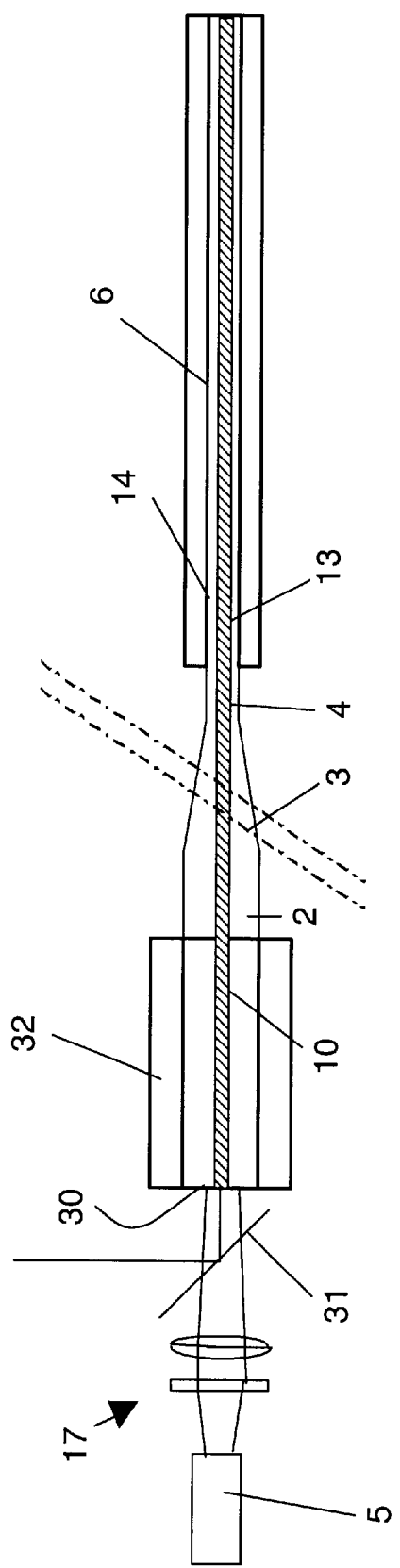
FIG. 5 is a schematic diagram illustrating a longitudinal section of a fiber amplifier comprising an optical pumping device according to a second embodiment of the present invention.

With reference now to FIG. 5, another alternative amplifier configuration is shown. Here, instead of using the v-groove side pumping arrangement of FIGS. 1 to 4B, the pump light is coupled into an end surface 30 of the pigtail fiber, as shown. In this configuration, the pigtail fiber in which the light guiding portion 1 is formed is also of a double cladding structure. This is required to allow pump light which is coupled into the inner cladding 9 of the pigtail to propagate without significant attenuation to the tapered portion located in the same fiber.

A dichroic beam splitter 31 is interposed between the pump diode 5 and its optical system 17 on the one hand and the end face 30, on the other. This beam splitter 31 is for coupling signal light to be amplified into or amplified light out of the core 10 of the fiber pigtail 32. The beam splitter 31 is highly reflective at the signal wavelength and highly transmissive at the pump wavelength. The end face 30 of fiber pigtail 32 can be antireflection coated at both wavelengths. In addition, in order to further reduce reflections of signal light in the core 10, the end face 30 can be fabricated at a small angle relative to the axis of the fiber pigtail 32.

The optical pumping device of the present invention can also be used to construct a fiber laser. An end pumped fiber laser comprising the end-pumping device of FIG. 5 is shown in FIG. 6A. Here, the end face 30 of fiber pigtail 32 is coated to have high reflectivity at the lasing wavelength of doped core 13 of the gain fiber 6 and high transmission at the pump wavelength. A reflector 33 at the far end of gain fiber 6 completes the fiber laser cavity. The reflector 33 can be highly reflective at the pump wavelength and partially reflective at the lasing wavelength.

With reference to FIG. 6B, a fiber laser can also be made using a Bragg fiber grating. Here the end face 30 of the fiber pigtail 32 is antireflection coated at the pump wavelength, and the laser mirror is in the form of a fiber grating 35 written into the core 10 of the pigtail fiber.

The v-groove pumping device of FIGS. 1 to 4B may also be employed for pumping a fiber laser. In that case, a reflector at end face 30 of fiber pigtail 32 may be fully reflecting at the wavelength of the pump light, too.

In all of the amplifier and lasers described in this invention various core dopants can be used. As already described, Er is of primary interest because of wide use of 1.5 μm amplifiers in fiber communication systems. Fiber amplifiers based on other dopants can also benefit from the high pump powers and intensities made possible by this invention. With conventional double cladding fibers, the relatively low pump intensities make it difficult to obtain sufficiently high population inversion to obtain significant gain in a fiber gain medium that operates on a 3-level type transition. To achieve significant population inversion and gain in 3-level gain media, the pump intensity must be sufficiently high to achieve depletion of the ground state (terminal) atomic level. Er and Yb atomic transitions are of 3-level type at the short end of their gain spectra. The Er transition is almost entirely 3-level for wavelengths in the 1480–1530 nm range, which are of great interest for short band fiber communication systems. Similarly, the Yb transition is almost entirely 3-level for wavelength in the 975–1020 nm range, which are of great interest for pumping of fiber amplifiers and sensing applications. Using conventional double cladding fibers with Er/Yb co-doped cores, the shortest wavelength for getting significant gain is approximately 1530 nm, while the shortest wavelength for conventional Yb doped double cladding fibers is approximately 1020 nm. Using techniques described in this invention amplification in double cladding gain fibers at wavelengths substantially shorter than these values is possible. Other types of commonly used fiber amplifiers, which will also benefit from this invention, are based on Nd-doped silica and Tm-doped silica.

An advantage of this invention is that it allows very short amplifiers to be constructed using core dopants that can be used with high concentrations, such as Yb, Er/Yb, Nd, and Tm. With Yb for example, very high concentrations, corresponding in core absorption coefficients of 1000–2000 dB/m can be used. In a double cladding fiber with an area ratio of R=25, such as would be the case for a 10 μm core and 50 μm inner cladding, this translates into a cladding absorption of 40–80 dB/m, making it possible to build high efficiency fiber amplifiers and lasers as short as 12.5–25 cm (90% pump absorption). Such fiber lasers are required to achieve single mode longitudinal mode emission. Very short fiber amplifiers, because of reduction of nonlinear effects in the fiber core, can be used to generate very high peak power pulses.

Figure 7:
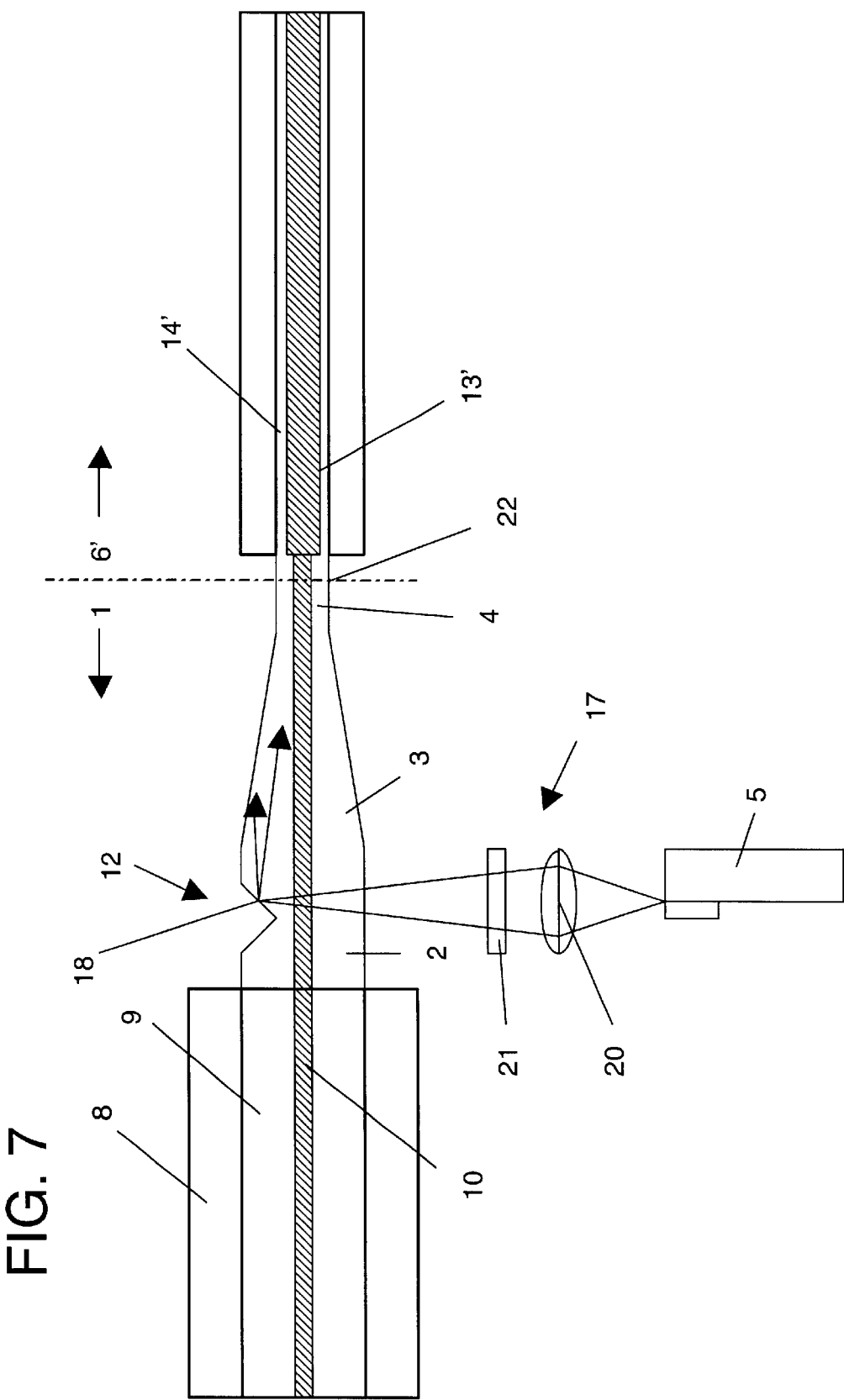
FIG. 7 is a schematic diagram illustrating a short fiber amplifier in which a large core double cladding fiber is coupled to an optical pumping device.

Since pumping devices according to the present invention make it possible to pump efficiently, gain fibers having much smaller area ratios than those mentioned above, e.g., with larger core diameters of the gain fiber, can be used so that even shorter amplifiers can be constructed. For a core diameter of 25 μm and a 50 μm diameter cladding the area ratio is R=4, resulting in a cladding absorption coefficient of 250–500 dB/m. Such fibers will allow construction of efficient amplifiers with a length of only 2–4 cm. Although normally such large cores can support many spatial modes, it has been shown by M. Fermann, "Single-mode excitation of multimode fibers with ultrashort pulses", Optics Lett. Vol. 23, pp. 52–54, 1998 that a single mode seed can excite only the fundamental mode of a large core fiber. Particularly for the case of very short gain fiber length, the fundamental mode can propagate with no significant single mode-to-multimode conversion. In this invention, the single mode seed signal can be provided through the use of a pumping device with a single mode core 10, which is directly spliced to a multi-mode core 13' of a double cladding gain fiber 6' as shown in FIG. 7. To improve the small core to large core fundamental mode coupling the cores 10, 13' can be tapered during the fusion splicing process. When single mode fiber amplifier/laser output is not required the core 10 in the pumping device can be the same size as the large multimode core 13' in the double cladding gain fiber 6.

Figure 8:
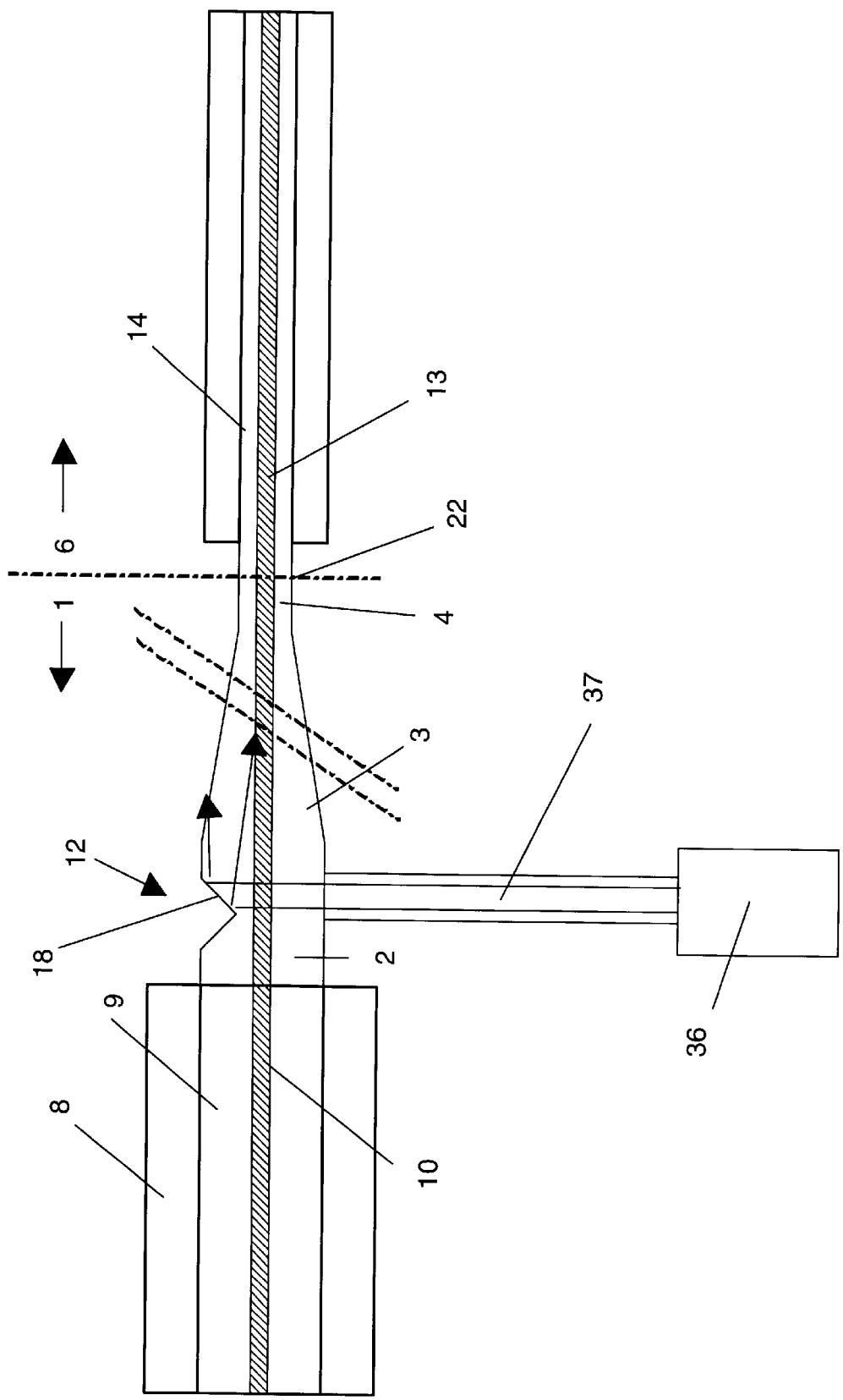
FIG. 8 is a schematic diagram illustrating a longitudinal section of a fiber amplifier having a diode bar as a pump light source.

Alternatively, a fiber coupled laser diode bar may be used as a light source of a pumping device for pumping a double cladding gain fiber. Fiber coupled bars can deliver power of up to 40 W in a 200 μm diameter fiber with a NA of 0.22. As shown in FIG. 8, pump light from a fiber 37 coupled bar 36 can be injected into the inner core 10 of a pumping device using a v-groove 12, or by using an end coupling arrangement similar to that of FIG. 5.

To facilitate coupling of pump light from the pump fiber 37 into the double cladding gain fiber, various optical elements such as lenses can be interposed between the end of the pump fiber 37 and the wide diameter portion 2 with the v-groove 12.

Starting with a 450 μm diameter fiber to fabricate the tapered portion, a taper reduction ratio of 2.5 would allow the power from pump fiber 37 to be efficiently coupled into a 180 μm diameter, 0.55 NA double cladding gain fiber 6, resulting in a pump intensity which is comparable to that achieved with a single 4 W broad stripe laser diode coupled into a double cladding gain fiber 6 with a diameter of 57 μm. The 450 μm diameter of the wide diameter portion 2 of the light guiding section 1 allows a v-groove depth and half-width of approximately 215 μm, which is sufficiently large to allow a small amount of diffractive spreading of the pump light as it travels from the end of the pump fiber 37 to the surface of v-groove 12, as shown in FIG. 8. Because of the relatively large 0.22 numerical aperture of the pump light incident on the v-groove facet surface, total internal reflection at the facet surface will not provide sufficiently large angular coverage, and a high reflectivity coating with a large angular acceptance range might be required to be deposited on the v-groove surface. One of the advantages of the fiber coupled source is that the available power is approximately 10 times greater than that from a single broad stripe laser diode, another is that the pump source is remotely located from the gain fiber 6.

The advantages of the invention include providing a means for achieving a high pump power density in double cladding gain fibers. Using the pumping device of the invention it is possible to construct high power amplifiers at 1.5 μm using Er doping rather than Er/Yb co-doping, allowing a flatter gain distribution required for WDM systems and other applications. The invention also makes it possible to construct such amplifiers using a v-groove side-pumping technique with a large misalignment tolerance, provides access to ends of the double cladding fiber so that conventional single mode fiber pigtails can be fusion spliced to the ends.

Alternative pumping schemes can use bulk lenses to achieve pump beam reduction that is obtained through the use of the tapered fiber region described above. Coupling of the pump light can be achieved through the end of the double cladding fiber using dichroic beam-splitters to combine the pump light with the signal light.

As stated above, the tapered and narrow portions of the light guiding section may be fabricated by chemical etching or laser ablation of the fiber surface. An advantage of these methods of taper fabrication are that the diameter of the single mode core remains constant throughout the taper allowing the narrow end to be fusion spliced to a double cladding doped fiber with a matching core and mode field diameters. A disadvantage of these methods is that material removal from the fiber surface can produce surface roughness that can scatter the pump light, resulting in a decrease in amplifier efficiency.

Figure 9:
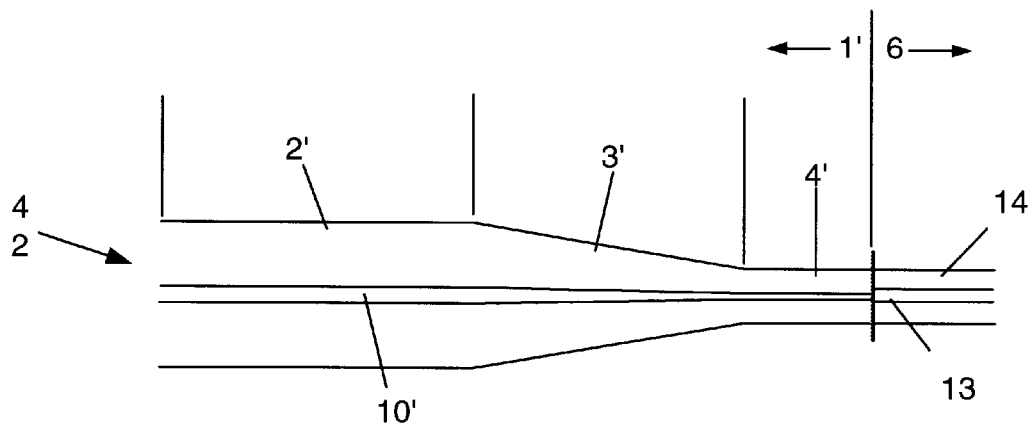
FIG. 9 is a schematic diagram illustrating a longitudinal section of a tapered light guiding fiber and an amplifier fiber in which the taper is formed using a heating and pulling technique.

Accordingly, an alternative method of achieving the tapering described herein and fabricating the tapered portion 3' and narrow portion 4' of the light guiding section 1' includes a heating and pulling technique. With reference now to FIG. 9, an optical pumping device 40 (e.g. an amplifier) comprising a light guiding section 1' made by the heating and pulling technique is shown.

Figure 10:
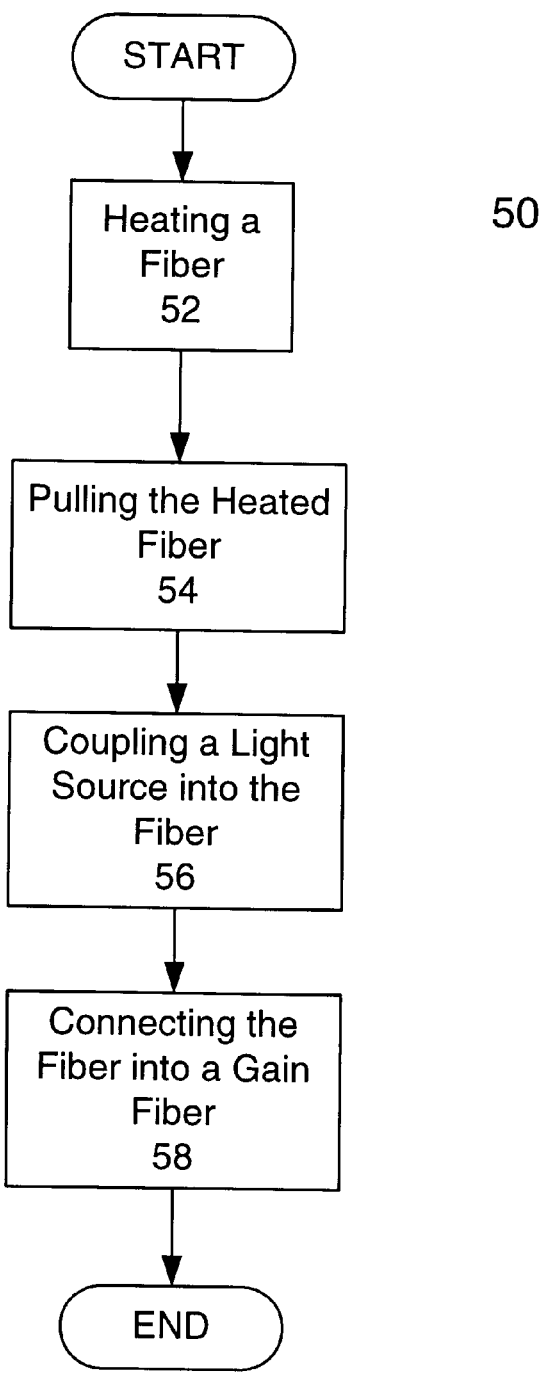
FIG. 10 is a flowchart illustrating an exemplary method of forming a tapered light guiding fiber in which the taper is formed using a heating and pulling technique.

Referring to FIG. 10, a flowchart illustrating a method 50 of fabricating an optical pumping device 40 with a tapered light guiding section 1' according to the heating and pulling technique is shown. The method 50 preferably comprises heating 52 a fiber (preferably a single mode fiber 42 with an undoped core 10'), pulling 54 the heated single mode fiber 42 until the desired tapered portion 3' and a narrow portion 4' of the desired length are achieved, coupling 56 (e.g., via a v-groove 12 fabricated in the fiber 42) a light source (e.g., a broad stripe laser diode 5) into the tapered single mode fiber 42, and connecting 58 (e.g., by fusion splicing) the tapered single mode fiber 42 to a double cladding gain fiber 6. In a preferred embodiment of the heating and pulling technique, the fiber 42 of the light guiding section 1' is heated to the softening point of silica and pulled to create the tapered portion 3' and the narrow portion 4'. The heating step 52 may be accomplished through a variety of means, including flame torch, $CO_2$ laser, an electric arc or resistive heating. Ideally, the tapered light guiding section 1' should include a constant diameter wide portion 2', a tapered portion 3', and a fixed diameter narrow portion 4'. The constant diameter portions 2' and 4' allow the tapered light guiding section 1' to be cleaved and fusion spliced (or otherwise connected) to fibers (e.g., double cladding gain fiber 6) with matching diameters.

Referring again to FIG. 9, unlike previously disclosed methods relying on material removal from the fiber 42 surface to achieve a reduction in fiber diameter without effecting the core diameter, the heating-and-pulling technique reduces the single mode core 10' diameter by the same ratio as the reduction in the outer fiber 42 diameter. The single mode field radius $w_o$, defined as the distance from the fiber center where the power density decreases to $1/e^2$ of its maximum, is related to the fiber core radius a by the approximate expression:

$$w_o = a(0.65 + 1.62/V^{1.5})$$

where the V number of the core 10' is given by $2\pi a NA/\lambda$, and NA is the numerical aperture of the core 10'. This expression for $w_o$, when plotted, shows that $w_o$ reaches a minimum for a specific value of core radius, and increases for core radii below or above this value. For a typical telecommunications fiber (NA=0.12, $\lambda$=1550 nm), a minimum in the mode field radius occurs at a=2.6 $\mu$m where $w_o$=4.6 $\mu$m. Ideally, the tapered portion 3' should be fabricated so that the outer cladding diameter and the mode field radius $w_o$ of the narrow end of the taper match the outer cladding diameter and the mode field radius $w_o$ of the double cladding doped fiber used to construct the amplifier. A tapered portion 3' constructed in this manner minimizes the pump light and signal light coupling losses into the double cladding fiber 6. In some cases the mode field radii $w_o$ of the light guiding section 1' and the doped double cladding fiber 6 might differ. In those cases the taper of the tapered portion 3' can be used to adiabatically increase or decrease the mode size so that it matches the mode of the doped double cladding fiber 6.

Figure 11:
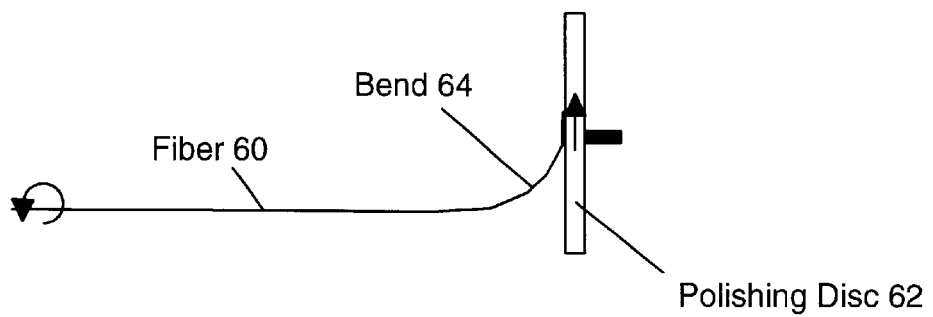
FIG. 11 is a schematic diagram illustrating the fabrication of a tapered light guiding fiber with a polishing disc.

With reference now to FIG. 11, another technique of fabricating an optical pumping device with a tapered light guiding section 1 is shown. As shown, a fiber 60 (preferably a single mode fiber 42 with an undoped core 10) is rotated, around an axis defined by the fiber's 60 core (not shown in FIG. 11) and bent so that the fiber 60 contacts a polishing disc 62 at an angle. The polishing disc 62 is preferably rotating. The bend 64 in the fiber 60 causes a variation in the contact pressure of the fiber 60 with the polishing disc 62. The variation in the contact pressure results in a different rate of glass removal (i.e., of the cladding) of the fiber 60 along the length of the fiber 60, resulting in a tapering from a wide portion (not shown in FIG. 11) to a narrow portion (not shown in FIG. 11). The length and ratio of the taper may be adjusted by varying the radius of the bend 64, the polishing time and/or the rotation rates of the polishing disc 64 and the fiber 60. A method using the polishing technique described herein is similar to the method 50 shown in FIG. 10, with the heating 52 and pulling 54 steps replaced by steps of bending the fiber 60 and polishing the fiber 60.

While the invention has been described with reference to the exemplary embodiments thereof, those skilled in the art will be able to make various modifications to the described embodiments of the invention without departing from the true spirit and scope of the invention. The terms and descriptions used herein are set forth by way of illustration only and are not meant as limitations. Those skilled in the art will recognize that these and other variations are possible within the spirit and scope of the invention as defined in the following claims and their equivalents.

What is claimed is:

1. An optical pumping device for pumping a fiber amplifier or fiber laser, comprising:
    a light guiding section, the light guiding section comprising a cladding layer surrounding a fiber core, wherein the cladding layer comprises:
        a wide diameter portion, including a lateral v-shaped groove in the wide diameter portion;
        a narrow diameter portion; and
        a tapered portion, connecting said wide and narrow diameter portions,
    wherein the tapered portion is fabricated with a heating and pulling technique; and
    a light source arranged to couple pump light into the cladding layer at the wide diameter portion, said light essentially propagating along the tapered portion towards the narrow diameter portion, wherein the light source is arranged to irradiate the v-shaped groove.

2. The optical pumping device according to claim 1, wherein the ratio of the diameter of the wide diameter portion to the diameter of the narrow diameter portion is in a range of 1.5:1 to 6:1.

3. The optical pumping device according to claim 1, wherein the length of the tapered portion is at least 50 times the diameter of the wide diameter portion.

4. The optical pumping device according to claim 1, wherein the ratio of the diameter of the cladding layer to the diameter of the core is in a range from 1.5:1 to 10:1 in the narrow diameter portion.

5. The optical pumping device according to claim 1, wherein the light source comprises two crossed cylindrical lenses focusing the pump light onto the v-shaped groove.

6. The optical pumping device according to claim 5, further comprising a first lens for gathering light from the light source with a first numerical aperture in a first plane and focussing it onto a facet of the groove with a second numerical aperture smaller than the first one.

7. The optical pumping device according to claim 6, wherein the second numerical aperture is in a range of 0.05 to 0.2.

8. The optical pumping device according to claim 6, further comprising a second lens for gathering light from the light source with a third numerical amplitude in a second plane and focussing it onto the facet of the groove with a fourth numerical aperture, the third numerical aperture being smaller than the first one and the second and fourth numerical amplitudes being approximately the same.

9. The optical pumping device according to claim 8, wherein the first and second lenses are crossed cylindrical lenses.

10. The optical pumping device according to claim 1, wherein the light source comprises a micro-lens with a front and back surface comprising crossed cylindrical lenses.

11. The optical pumping device according to claim 1, wherein the pump light from the light source is coupled into the wide diameter portion with a numerical aperture of 0.05 to 0.2.

12. The optical pumping device according to claim 1, wherein the light source is a broad stripe laser diode.

13. The optical pumping device according to claim 1, wherein the light source is a fiber coupled laser diode array.

14. The optical pumping device according to claim 1, wherein the light guiding section comprises a second cladding layer.

15. The optical pumping device according to claim 1, wherein the taper portion is sufficiently long enough to avoid power losses in the taper portion for light propagating in the cladding.

16. The optical pumping device according to claim 1, wherein the light source is arranged to couple light into an end surface of the wide diameter portion of the light guiding section.

17. The optical pumping device according to claim 16, further comprising Bragg fiber grating reflectors.

18. The optical pumping device according to claim 17, further comprising a dichroic beam-splitter having a reflectivity adapted to combine and/or separate pump light from the light source with and/or from a signal light propagating through the fiber core.

19. The optical pumping device according to claim 1, wherein the pump light is focused by the light source with low numerical aperture focusing.

20. The optical pumping device according to claim 1, further comprising a gain fiber comprising a first cladding layer and a doped core, wherein a first end of the gain fiber is connected to the narrow diameter portion of the light guiding section in order to propagate light from the light source through the first cladding layer of the light guiding section into the first cladding layer of the gain fiber.

21. The optical pumping device according to claim 20, wherein the doped core is a multimode core.

22. The optical pumping device according to claim 20, wherein the fiber core of the light guiding section has a diameter and the doped core of the gain fiber has a diameter greater than the diameter of the fiber core of the light guiding section.

23. The optical pumping device according to claim 1, wherein the fiber core is a multimode core.

24. The optical pumping device according to claim 1, wherein the coupling of the light source and the light guiding section has a large coupling alignment tolerance.

25. The optical pumping device according to claim 1, wherein the fiber core has a core diameter and the core diameter is smaller in the narrow diameter portion than in the wide diameter portion.

26. An optical fiber device comprising:
a first pumping device, comprising:
a light guiding section, the light guiding section comprising a cladding layer surrounding a fiber core that has a core diameter, wherein the cladding layer comprises a wide diameter portion, a narrow diameter portion and a tapered portion connecting said wide and narrow diameter portions and the tapered portion is fabricated with a heating and pulling technique so that the core diameter is narrower in the narrow diameter portion than the wide diameter portion; and
a light source arranged to couple pump light into the cladding layer at the wide diameter portion, said light essentially propagating along the tapered portion towards the narrow diameter portion; and
a gain fiber comprising a first cladding layer and a doped core, wherein a first end of the gain fiber is connected to the narrow diameter portion of the light guiding section in order to propagate light from the light source through the first cladding layer of the light guiding section into the first cladding layer of the gain fiber.

27. The optical fiber device according to claim 26, wherein the gain fiber has a second cladding layer surrounding the first cladding layer.

28. The optical fiber device according to claim 26, wherein a second pumping device is connected to a second end of the gain fiber.

29. The optical fiber device according to claim 28, wherein a third pumping device is inserted at an intermediate location of the gain fiber between the first pumping device and the second pumping device.

30. The optical fiber device according to claim 26, wherein a dopant of the doped core is selected from a group comprising Er, Yb, Er/Yb, Nd, Tm.

31. The optical fiber device according to claim 26, wherein the doped core is doped with Er and is essentially free of Yb.

32. The optical fiber device according to claim 26, wherein the optical fiber device is a fiber amplifier.

33. The optical fiber device according to claim 26, wherein the optical fiber device is a fiber laser.

34. The optical fiber device according to claim 26, wherein the doped core has a doped core diameter and the doped core diameter is larger than the core diameter of the fiber core of the light guiding section.

35. The optical fiber device according to claim 26, wherein the cladding layer comprises a lateral v-shaped groove in the wide diameter portion, and the light source is arranged to irradiate the v-shaped groove.

36. A method of fabricating an optical pumping device comprising the steps of:
heating a first fiber of a constant first diameter until the fiber is capable of being stretched;
pulling the heated first fiber to create a wide portion, a tapered portion and a narrow portion in the heated first fiber, wherein the wide portion has the constant first diameter, the narrow portion has a constant second diameter that is smaller than the constant first diameter, and the tapered portion has a tapering diameter that joins and tapers from the wide portion to the narrow portion;
coupling a light source into the wide portion of the first fiber, wherein the coupling step includes:
fabricating a v-groove into the wide-portion of the first fiber; and
focusing light from the light source into the v-groove; and
connecting the first fiber to a gain fiber.

37. The method of claim 36, wherein the first fiber is a single mode fiber with an undoped core.

38. The method of claim 36, wherein the gain fiber is a doped double cladding fiber.

39. The method of claim 36, wherein the coupling step couples light from a broad stripe laser diode into the v-groove in the wide portion.

40. The method of claim 36, wherein the connecting step fusion splices the first fiber to the gain fiber.

* * * * *